(12) United States Patent
Jones et al.

(10) Patent No.: US 6,845,895 B2
(45) Date of Patent: Jan. 25, 2005

(54) VEHICLE STORAGE DEVICE

(76) Inventors: Casey C. Jones, 702 N. 120 E., Hurricane, UT (US) 84737; Nola M. Samuels, 702 N. 120 E., Hurricane, UT (US) 84737

(*) Notice: Subject to any disclaimer, the term of this patent is extended or adjusted under 35 U.S.C. 154(b) by 25 days.

(21) Appl. No.: 09/910,456

(22) Filed: Jul. 20, 2001

(65) Prior Publication Data

US 2003/0015562 A1 Jan. 23, 2003

(51) Int. Cl.[7] .................................................. A45F 4/00
(52) U.S. Cl. ...................... 224/585; 224/328; 224/330; 224/430; 224/495; 224/511; 296/37.1
(58) Field of Search ................................. 224/585, 328, 224/330, 430, 495, 511, 433, 439, 434, 279, 281, 318, 319, 309, 431, 453, 435, 437, 438, 420, 447, 448, 488, 543, 917.5, 924; 296/37.1

(56) References Cited

U.S. PATENT DOCUMENTS

| | | | |
|---|---|---|---|
| 4,066,196 A | * | 1/1978 | Jackson et al. ............. 224/431 |
| 4,159,844 A | | 7/1979 | Weiner |
| 4,271,996 A | * | 6/1981 | Montgomery ................ 224/430 |
| 4,315,583 A | * | 2/1982 | Hine, Jr. ...................... 224/448 |
| 4,487,344 A | * | 12/1984 | Blackburn et al. ........... 224/424 |
| 4,542,839 A | * | 9/1985 | Levine et al. ................ 224/431 |
| 4,671,438 A | * | 6/1987 | La Plante .................... 224/438 |
| 4,746,164 A | | 5/1988 | Crean |
| 4,941,703 A | | 7/1990 | Curry |
| 5,024,359 A | * | 6/1991 | Thomas ....................... 224/417 |
| 5,096,107 A | * | 3/1992 | VanSon ....................... 224/328 |
| 5,282,554 A | * | 2/1994 | Thomas ....................... 224/421 |
| 5,484,090 A | * | 1/1996 | Lyshkov ...................... 224/432 |
| 5,667,117 A | * | 9/1997 | Nutto .......................... 224/417 |
| 6,328,190 B1 | * | 12/2001 | Lohr ........................... 224/431 |
| 6,505,765 B1 | * | 1/2003 | Proctor et al. ............... 224/413 |

* cited by examiner

Primary Examiner—Lee Young
Assistant Examiner—Maerena Brevard
(74) Attorney, Agent, or Firm—TraskBritt

(57) ABSTRACT

A rear-mounted, removable vehicle storage device for storing and/or transporting items with a vehicle. The vehicle storage device includes a material shell defining a storage space therein. The material shell may be self-supporting or supported by an interior frame structure. The vehicle storage device may be mounted on a vehicle ladder, equalizer hitch, tire mount, or bumper. In addition, a recreational equipment carrier may be incorporated with the vehicle storage device.

6 Claims, 4 Drawing Sheets

VEHICLE STORAGE DEVICE

BACKGROUND OF THE INVENTION

1. Field of the Invention

The present invention relates to vehicle storage devices. More particularly, the present invention relates to rear-mounted, removable vehicle storage devices for recreational vehicles, sports-utility vehicles, and the like.

2. State of the Art

The use of external storage devices with vehicles provides an excellent way to increase the carrying capacity of the vehicle. For example, numerous storage devices have been invented to carry additional luggage on the roof rack of the vehicle. One such storage device is the Rocketbox made by Yakima. The Rocketbox is a hard plastic or fiberglass storage container that is aerodynamically shaped to cut through the wind. Attached to the roof of a vehicle, the Rocketbox allows the user to store additional luggage or materials outside of the vehicle, thereby freeing up interior space within the vehicle. Other storage devices, similar to the Rocketbox, are made and sold by other companies.

Similarly, square or rectangular boxes made of plastic are used for storing luggage or other items on the tops of recreational vehicles (RV). The storage device is attached or fixed to the roof of the RV. A ladder found on the back portion of an RV commonly provides access to such storage devices. Use of such storage boxes, however, can be undesirable. First, because the storage box mounts to the roof of the RV, access to the storage box is difficult. To store items within the storage box, a user must carry those items up a ladder or devise some other method of moving the items to be stored to the roof of the RV. Furthermore, the additional height of the storage box on top of the RV can pose clearance problems depending upon the height of the RV to which the storage device is attached.

Other alternative storage methods have also been disclosed for vehicles. For example, U.S. Pat. No. 4,159,844 to Weiner discloses storage drawers that increase the carrying capacity of an RV by providing large drawers that can be pulled out from below the RV's under frame. Although such storage drawers provide additional storage for the RV, the clearance under the RV can be limited by their use.

Accordingly, it is desirable to provide a vehicle storage device capable of storing items while at the same time providing easy access to the stored items.

SUMMARY OF THE INVENTION

The present invention relates to vehicle storage devices, and more particularly, to rear-mounted, removable vehicle storage devices. The vehicle storage devices of the present invention mount to the back of a vehicle, on a ladder, by tire mount, by equalizer hitch mount, or by bumper mount. The vehicle storage devices may also include additional attachments or fixtures for transporting bicycles, skis, snowboards, or other outdoor recreational equipment.

In one embodiment of the present invention, the vehicle storage device comprises a structural frame covered with a material, forming a storage space within the covered structural frame. Typically, the frame is constructed of materials such as plastic, metal, composites or wood. The material covering the frame may include metal, plastic, fiberglass, cloth, or other material sufficient to protect items stored within the vehicle storage device from the weather or elements. Preferably, the material is durable and water resistant. An access portal in the material covering the frame provides ingress and egress to the interior of the vehicle storage device for inserting or removing items from the vehicle storage device. The access portal may be secured in position with fasteners such as VELCRO, zippers, hooks, snaps, clamps, or door latches, depending upon the type of material used to cover the frame. A removable portion of material covering a top portion of the frame may act as a flap, cover, or lid through which items may also be inserted or removed from the storage space of the vehicle storage device.

Hooks attached to the back portion of the frame of the vehicle storage device may be used to hang the vehicle storage device on a ladder of a vehicle, such as a recreational vehicle (RV). Additional clamps may be used to help secure the vehicle storage device to a vehicle ladder once the vehicle storage device is attached to the ladder by hooks. The clamps may include locking clamps to help prevent theft of the vehicle storage device.

In another embodiment of the invention, adjustable or fixed clamps attached to the frame of the vehicle storage device are used to clamp the vehicle storage device to a vehicle ladder.

In still another embodiment of the present invention, the vehicle storage device includes a mounting plate attached by a hinge to the back portion of the frame. Adjustable and/or fixed clamps attached to the mounting plate may be used to secure the vehicle storage device to a ladder on the back of a vehicle. Once attached, the frame of the vehicle storage device may be swung away from the mounting plate and ladder through use of the hinged attachment between the frame and mounting plate. Thus, the ladder may be used without removing the vehicle storage device from the ladder. The frame of the vehicle storage device may be secured to the mounting plate by any type of clasp or clamping device known in the art.

Alternate attachments may also be used to secure the vehicle storage device to the back of a vehicle. Such attachments include equalizer hitch mounts, bumper mounts, tire mounts, and the like. The mounts may attach to the frame of the vehicle storage device, or a mounting plate, thereby securing the vehicle storage device to the back of a vehicle.

Additional equipment carriers may also be incorporated with the vehicle storage device. A bicycle rack, attached to the frame of the vehicle storage device or to a mounting device, may be used to transport bicycles with the vehicle storage device. The bicycle rack may also include a pivot point allowing the bicycle rack to be rotated away from the vehicle storage device, thereby providing uninhibited access to the vehicle storage device. Similarly, racks for carrying skis, snowboards, or other recreational equipment may also be incorporated with the vehicle storage device.

Optional wheels may be included with the vehicle storage device. Typically, two wheels mounted or moveably secured to the bottom of the frame of the vehicle storage device facilitate easy transportation of the vehicle storage device when it is disengaged from a vehicle. Tilting the vehicle storage device onto the wheels allows a person to either push or pull the vehicle storage device along a surface.

DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
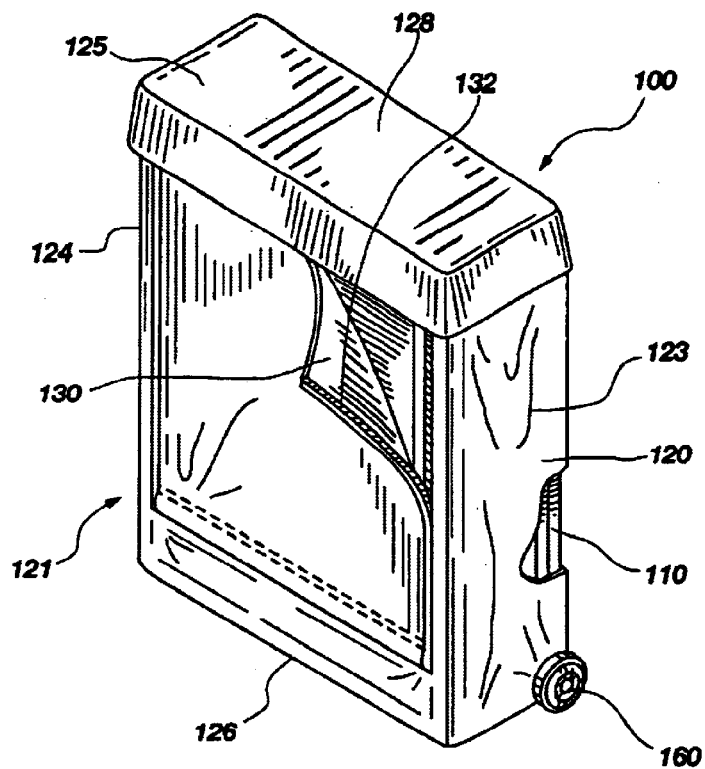
FIG. 1 illustrates a perspective view of one embodiment of the present invention.

The present invention relates to vehicle storage devices, and more particularly, to rear-mounted vehicle storage devices and the like. One embodiment of the vehicle storage device 100 of the present invention is illustrated in FIGS. 1 through 4. As illustrated, the vehicle storage device 100 comprises a frame 110 covered by material 120. The material 120 covering the frame 110 forms a storage compartment or space within the vehicle storage device 100. In this particular embodiment, the frame 110 and the material 120 of the vehicle storage device 100 form a rectangular shaped box having a front portion 121, a back portion 122, a right sidewall 123, a left sidewall 124, a top portion 125, and a bottom portion 126. The top portion 125 of the illustrated embodiment is a top cover 128 constructed of material 120. It is understood that the vehicle storage device may take on different shapes depending upon the configuration of the frame 110 and the material 120 covering the frame 110. An access portal 130, integral to the front portion 121 of the vehicle storage device 100, provides access to the interior storage area or space created by the material 120 around frame 110. A mounting plate 150, shown in FIG. 2, connects to frame 110 via a hinge 152 exterior to the back portion 122 of the vehicle storage device 100. The hinge 152 protrudes through material 120 in the back portion 122 of the vehicle storage device 100. Mounting plate 150 also includes two fixed clamps 154 and two movable clamps 156 for attaching the vehicle storage device 100 to a vehicle ladder. Optional wheels 160 and handle 170 may be mounted to frame 110 through material 120 to facilitate mobility of the vehicle storage device 100 when disengaged from a vehicle.

Figure 3:
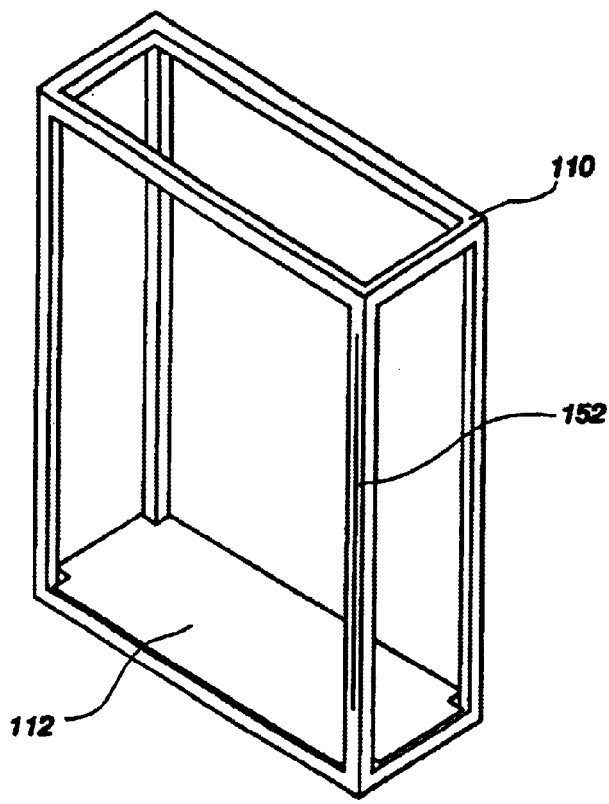
FIG. 3 illustrates a back view of the frame of the embodiment illustrated in FIGS. 1 and 2.

A cutaway portion of material 120 in FIG. 1 reveals a portion of frame 110 under material 120. A rear view of frame 110 is shown in FIG. 3 without the presence of material 120 covering frame 110. In a preferred embodiment, frame 110 is rectangular shaped and formed from strong, corrosion-resistant tubing. For example, tubing constructed from materials such as aluminum alloys, galvanized steel, carbon steel, stainless steel, plastic, or polymeric material may be used to form frame 110. Typically, metal tubing members are welded together to form frame 110. Other methods of securing the tubing members together to form frame 110 may also be used, especially when frame 110 is constructed of a plastic or polymeric material. For example, frame 110 may be constructed of detachable portions to allow the frame to be disassembled and more readily stored. Tubing members may clamp, screw or otherwise attach to form frame 110. Also, hinging mechanisms (not shown) may be used to allow frame 110 to fold or collapse for storage. Although the size of frame 110 may vary, it is preferred that frame 110 does not exceed the height or width of the vehicle to which it will be attached. Furthermore, frame 110 may be formed in any preferred shape.

In addition, frame 110 preferably includes a hinge 152 fixed to at least one support member or tube of frame 110. Hinge 152 may be welded to frame 110 or secured to frame 110 using other methods known in the art. Additionally, hinge 152 may be a detachable hinge that permits the hinge 152 to be disconnected so that the frame 110 of the vehicle storage device 100 may be detached from the mounting plate 150. This allows the mounting plate 150 to be set in position and left in a mounted position while the frame 110 and contents contained in the vehicle storage device 100 are removed.

An optional base plate 112 may be inserted within frame 110 to provide support to frame 110 or a better surface for supporting items stored within the vehicle storage device 100. Preferably, the optional base plate 112 is constructed of a durable material such as metal or hard plastic and is formed so that it may be inserted and removed from frame 110 as desired. For example, the optional base plate 112 may be configured as a flat panel with cutout corners to rest on the bottom tubing members of frame 110. A person using the vehicle storage device 100 could then insert or remove the optional base plate 112 as desired. Alternatively, optional base plate 112 may be permanently connected to frame 110 by welding, riveting or other substantially permanent connection.

Material 120 encloses frame 110, forming the storage space of the vehicle storage device 100. Preferably, material 120 is durable and water-resistant to help prevent exposure of the contents stored in the vehicle storage device 100 to the elements. Furthermore, the interior surface of material 120 may be padded or lined to protect the contents stored within the vehicle storage device 100. For example, material 120 may comprise a fleece-lined, waterproofed vinyl with the fleece-lined portion of material 120 on the interior of the vehicle storage device 100. Alternatively, material 120 may include COVER LITE, neoprene, SUNBRELLA fabric by Glen Raven Custom Fabrics, lacing/ziptie, carbon fiber, steel, fiberglass, aluminum products, or plastic products. Grommet holes (not shown) may also be included in portions of material 120 to allow the attachment of bungee cords, ropes, or bicycle locks to the vehicle storage device 100.

Figure 2:
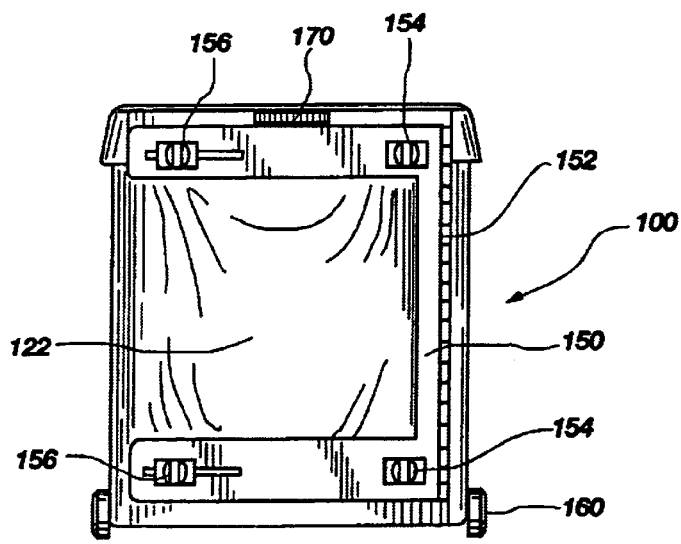
FIG. 2 illustrates a back view of one embodiment of the present invention illustrated in FIG. 1.

As illustrated in FIGS. 1 and 2, material 120 covers frame 110 forming front portion 121, back portion 122, right side wall portion 123, left side wall portion 124, and bottom portion 126. Material 120 may be permanently fastened to frame 110 or it may be removable. For instance, material 120 may be configured as a bag having a bottom and four sidewalls such that material 120 may be pulled onto frame 110 and secured thereto to form a vehicle storage device having an open top. Material 120 may be secured using fasteners known in the art such as snaps, hooks, ties, VELCRO, zippers, and the like. This allows material 120 to be removed for storage or for cleaning.

A removable top cover 128 encloses the top portion 125 of the vehicle storage device 100. Preferably, top cover 128 is made of the same material used to make material 120. Top cover 128 may be secured to either frame 110 or material 120 using fasteners such as buckles, zippers, VELCRO, snaps, hooks, or the like. Alternatively, a back portion of top cover 128 may be securely attached, or integral with, the portion of material 120 forming the back portion 122 of the vehicle storage device 100 such that the top cover 128 is permanently attached to material 120. The top cover 128 may be lifted or placed over the top portion of the vehicle storage device 100 to protect the contents stored therein from the elements.

An access portal 130 integral with material 120 provides access to the interior of the vehicle storage device 100. Preferably, access portal 130 is integral with the front portion 121 of the vehicle storage device 100. However, access portals 130 may also be located in the right sidewall 123, left sidewall 124 or back potion 122 of the vehicle storage device 100. Multiple access portals 130 are especially useful where the vehicle storage device 100 contains multiple compartments.

The access portal 130 is typically constructed of the same material as material 120. The access portal 130 is connected to material 120 using fastening devices well known in the art such as VELCRO, zippers, snaps, ties and the like. For example, FIG. 1 shows a zipper 132 connecting a portion of access portal 130 to material 120. A similar zipper 132 on the opposite side of access portal 130 connects that portion of the access portal 130 to material 120. The top portion of the illustrated access portal 130 may similarly be zippered, or otherwise attached, to material 120. Unzipping both zippers 132 allows access portal 130 to flap downward, revealing the interior of the vehicle storage device 100. In this manner, the storage space within the vehicle storage device 100 may be accessed to place or remove items therein.

In addition to the fastening device, the access portal 130 or material 120 may include protective flaps to cover the fastening devices and to help prevent exposure to the elements. For instance, material 120 may include an additional flap of material around zippers 132 such that when zippers 132 connect the access portal 130 to material 120, the zippers 132 are covered and protected by the additional flap of material. Such protective measures are commonly used with fastening devices and shall not be explained further herein.

A mounting plate 150 may be attached to frame 110 through material 120 on the back portion 122 of the vehicle storage device 100. Preferably, mounting plate 150 is attached to frame 110 via hinge 152. The positioning of hinge 152 along one side of mounting plate 150 and frame 110 allows separation of mounting plate 150 and frame 110 on the opposite side of the vehicle storage device 100. In order to prevent frame 110 from swinging on hinge 152, an additional clasp 158, or other fastening device, secures frame 110 and mounting plate 150 opposite hinge 152.

Attached to mounting plate 150 are fixed clamps 154 and movable clamps 156 used to secure the vehicle storage device 100 to a ladder of an RV or other vehicle. Typically, fixed clamps are welded to mounting plate 150 or are otherwise attached thereto. Moveable clamps 156 are attached to mounting plate 150 through holes in the mounting plate 150 allowing lateral movement of the movable clamps 156. To adjust the movable clamps 156, a standard screw or bolt may be loosened to allow the movable clamp 156 to move along the hole. Once positioned, the movable clamp 156 is secured in place by retightening the screw or bolt. Other known mechanisms or devices may also be used to secure the movable clamps 156 into the desired position. For instance, the movable clamps 156 may be fitted with a quick release device that allows a user to easily disengage the movable clamp 156 from a position on the mounting plate 150, move the movable clamp 156, and reengage the quick release mechanism to secure the movable clamp 156 to the mounting plate 150.

Fixed clamps 154 mount to one ladder post securing one side of the back portion 122 of the vehicle storage device 100 to the ladder. The movable clamps 156 are secured to a second ladder post, thereby securing the opposite side of the back portion 122 of the vehicle storage device 100 to the vehicle's ladder. The movable clamps 156 allow the vehicle storage device 100 of the present invention to be fitted to ladders of varying sizes. For larger ladders, the movable clamps 156 may be positioned farther from the fixed clamps 154. Similarly, smaller ladders may require that the movable clamps 156 be positioned closer to the fixed clamps 154 to attach to the ladder. Once attached, the fixed clamps 154 and movable clamps 156 secure the mounting plate 150 to the ladder of a vehicle.

Both fixed clamps 154 and movable clamps 156 may be any type of clamps capable of securing the vehicle storage device 100 to a ladder and supporting the weight of the items stored therein. Preferably, the fixed clamps 154 and movable clamps 156 include rubber or plastic inserts or padding to prevent damage to a ladder to which the clamps are attached. The clamps may be attached to a ladder post using spring-loaded clamping mechanisms, nut-and-bolt mechanisms, or other forms of clamping attachment known in the art. Fixed clamps 154 and movable clamps 156 may also including locking mechanisms for locking the clamps in a clamped position. Such locking clamps may be used to help prevent theft of a vehicle storage device 100 once clamped to a vehicle.

The vehicle storage device 100 of the present invention may also include wheels 160 attached to the frame 110, the mounting plate 150, or elsewhere on the vehicle storage device 100. Wheels 160 provide an easy way to move the vehicle storage device when disengaged from a vehicle. A handle built into the vehicle storage device 100 may be used to tip the vehicle storage device 100 onto its wheels 160 so that the vehicle storage device 100 may be pushed or pulled along a surface, such as the ground.

Figure 4:
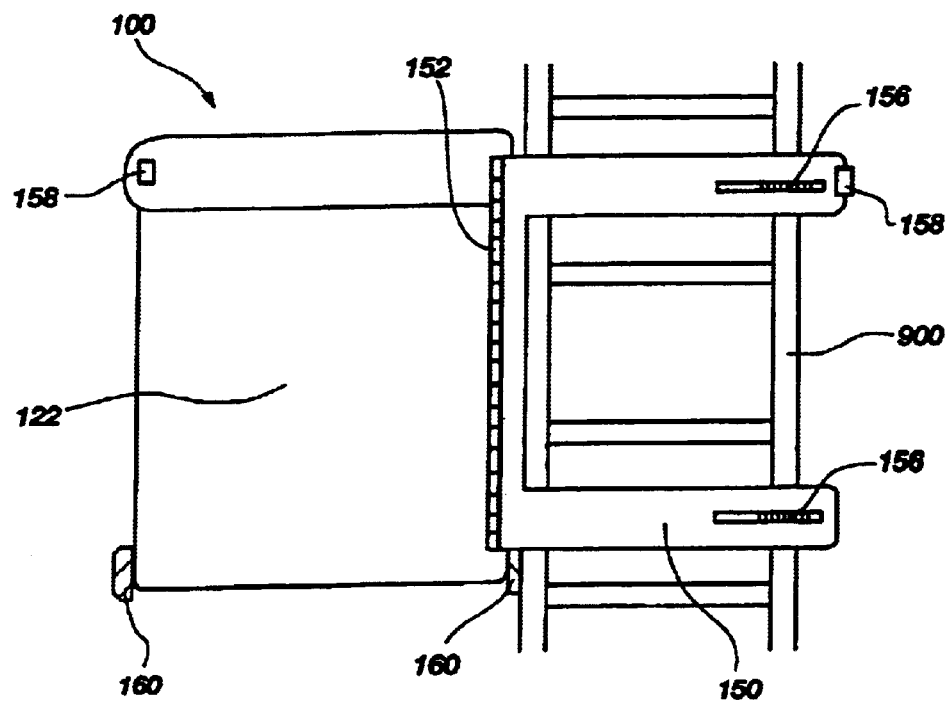
FIG. 4 illustrates one embodiment of the present invention attached to a vehicle ladder.

FIG. 4 depicts a vehicle storage device 100 of the present invention mounted on a vehicle ladder 900, such as the ladder of an RV. As illustrated, the vehicle storage device 100 is disengaged from the clasp 158 such that the storage area defined by frame 110 and material 120 swings freely on hinge 152. This allows an individual to use the vehicle's ladder 900 even if the vehicle storage device 100 is attached thereto. Because the mounting plate 150 does not obstruct the rungs of the ladder 900, a person may swing the storage area of the vehicle storage device away from the ladder 900 during use. Before proceeding, the storage area of the vehicle storage device 100 may be secured to the mounting plate with clasp 158.

Figure 5:
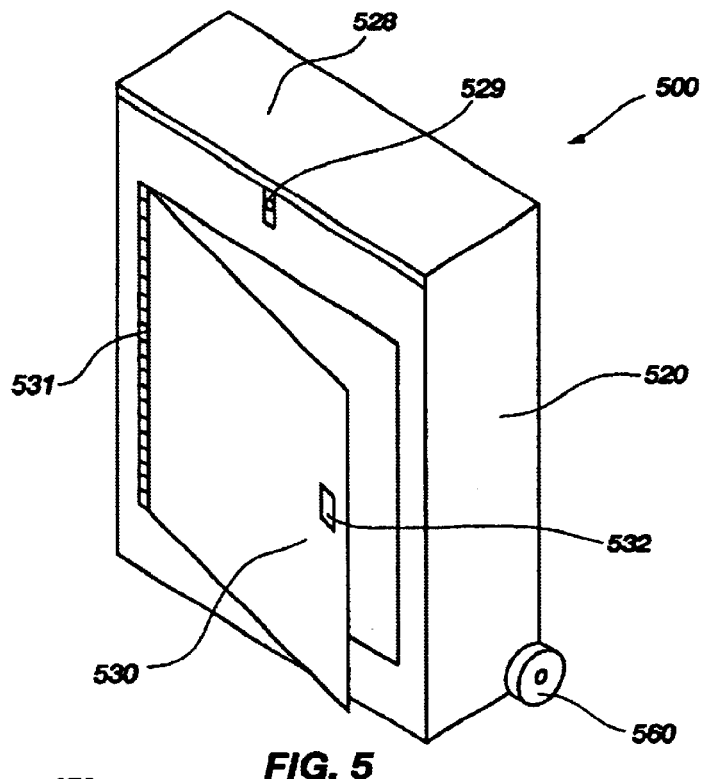
FIG. 5 illustrates an alternative embodiment of the present invention.

In an alternate embodiment of the present invention, the vehicle storage device is formed of a material such as fiberglass, plastic, injection molded plastic, metal, or the like. Vehicle storage devices 500 constructed from materials such as these provide additional protection from the elements and security of the contents stored in the vehicle storage device 500. They may also provide additional structural support, allowing greater loads to be carried within the vehicle storage device 500. The vehicle storage device 500, illustrated in FIG. 5, has no frame; rather, the structural integrity of the vehicle storage device 500 is maintained by the strength of the material 520 from which it is constructed. For instance, material 520 of vehicle storage device 500 may be steel or DIAMOND PLATE metal. A mounting plate may be mounted on the back portion of the vehicle storage device 500 just as it is mounted on the vehicle storage device illustrated in FIG. 1. However, the mounting plate hinge may be integral, or welded, to the material 520. The mounting plate may also be made of the material 520 used to make the vehicle storage device 500. Alternatively, the mounting plate may be constructed of some other durable material capable of holding and supporting the vehicle storage device 500 and stored contents when swung open. Vehicle storage device 100 may also include wheels 560.

Instead of a material flap, the access portal in vehicle storage device 500 may be a door 530 mounted on one or more hinges 531 that allow the door 530 to be opened to expose the interior of the vehicle storage device 500. A clasping mechanism 532 may be attached to the door 530 to secure the door 530 in a fixed position when closed. Also, the clasping mechanism 532 may include any locking mechanism (not shown) known in the art to limit access to the storage space within the vehicle storage device. Furthermore, an optional top lid 528 may replace the top cover. Alternatively, the material 520 may enclose the top portion of the vehicle storage device 500, forming a box or other structural shape. As with the door 530, the top lid 528 may include a clasping mechanism 529 and a locking mechanism to secure the top lid 528 and prevent exposure to the elements or curious eyes.

Figure 8:
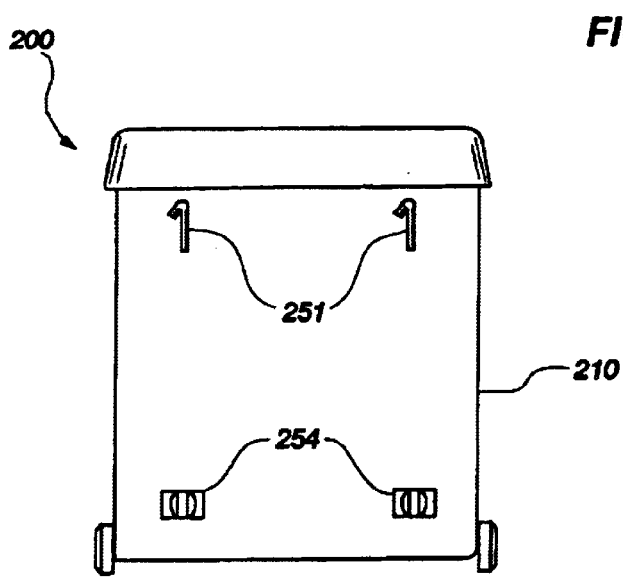
FIG. 8 illustrates a rear view of one embodiment of the present invention.

In an alternate embodiment of the present invention, a mounting plate is not included to mount the vehicle storage device to a vehicle. Instead, hooks 251 and fixed clamps 254 are mounted to the frame 210 of the storage device 200, as illustrated in FIG. 8. Depicted is a rear view of an alternate embodiment of the vehicle storage device 200. Hooks 251, connected to the frame 210, are used to hang the vehicle storage device 200 on a vehicle ladder. Fixed clamps 254 connected to frame 210 attach the vehicle storage device 200 directly to a vehicle ladder. Alternatively, hooks 251 may be substituted with clamps 254. Although the lack of the hinged mounting plate partially inhibits the use of the vehicle ladder, such a vehicle storage device 200 may be desirable in some instances.

In yet another embodiment of the present invention, the vehicle storage device 100 is not mounted to a vehicle ladder. Instead, the storage device 100 is mounted to a vehicle equalizer hitch or towing hitch. For example, an L-shaped mounting support, as known in the art, may be fixed to either the frame 110 or a mounting plate 150 connected to the frame 110 of the vehicle storage device 100. One end of the mounting support may be secured within an equalizer hitch of a vehicle, thereby supporting the storage device on the back of the vehicle. If the mounting support is attached to a mounting plate 150 of the vehicle storage device 100, the vehicle storage device 100 may be swung on a hinge 152 to allow access to the back of the vehicle to which the vehicle storage device 100 is mounted.

Other known mounting methods and devices may also be used to attach the vehicle storage device 100 to a vehicle. For example, a tire-mounting bracket allows the vehicle storage device 100 to be mounted on a spare tire on the back of a vehicle or to the spare tire mounting bracket. Similarly, a storage device 100 may be mounted to a bumper using a bumper-mounting bracket.

Figure 6:
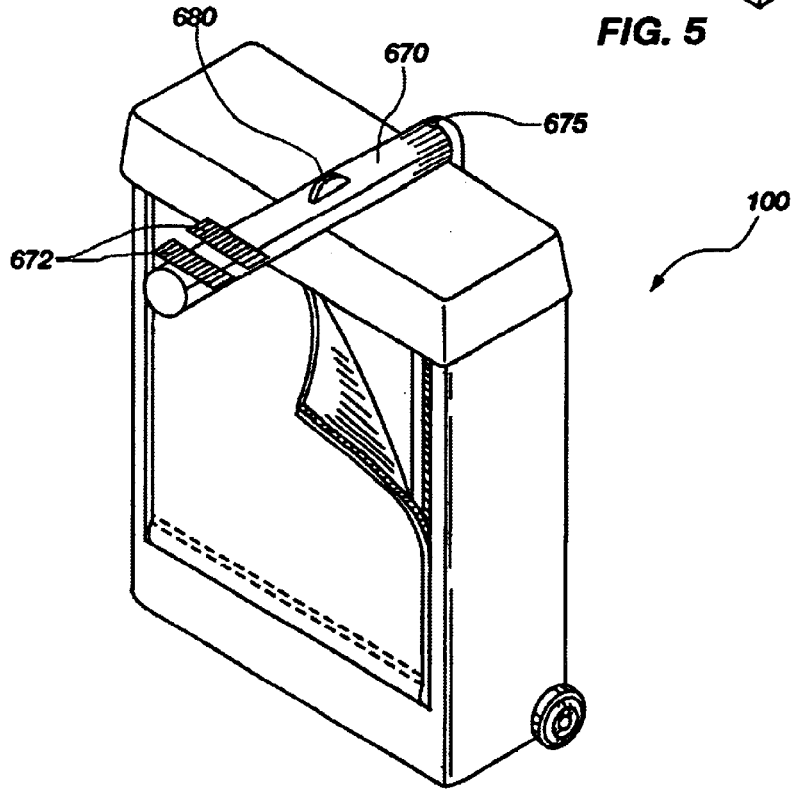
FIG. 6 illustrates an alternate embodiment of the present invention including a bicycle mount incorporated with the vehicle storage device.

In still another embodiment of the present invention, a recreational equipment carrier, such as a bicycle mount 670, is attached to the vehicle storage device 100 of the present invention. As shown in FIG. 6, the bicycle mount 670 extends over the top of the vehicle storage device 100 to support one or more bicycles. Bicycle support brackets 672 support bicycles set on the bicycle mount 670. Different types of bicycle support brackets 672 may be used as known in the art. Furthermore, the number of bicycle support brackets 672 incorporated with the vehicle storage device 100 is limited only by the size of the bicycle mount 670. The bicycle mount 670 may be fixed to the mounting plate of the vehicle storage device 100 or to another mounting bracket, depending upon the type of mounting device used to secure the particular vehicle storage device 100 to the vehicle. Also, a portion of the bicycle mount 670 may controllably rotate about a pivot point 675, thereby allowing a person to rotate any bicycles mounted to the bicycle mount 670 to the side of the vehicle storage device 100 so the contents of the vehicle storage device 100 may be accessed. Alternatively, the bicycle mount 670 is also removable from the mounting bracket or mounting plate so that it may be stored when not being used to carry bicycles.

The vehicle storage devices 100 of the present invention may also include locking device attachments capable of accepting a wire lock or bicycle lock. Using the locking device attachments, such as a grommet hole in the material of the vehicle storage device or a lock attachment device 680 (illustrated in FIG. 6), a chain or bicycle lock may be used to lock the vehicle storage device 100 to the vehicle, or bicycles to the vehicle storage device 100.

Figure 7:
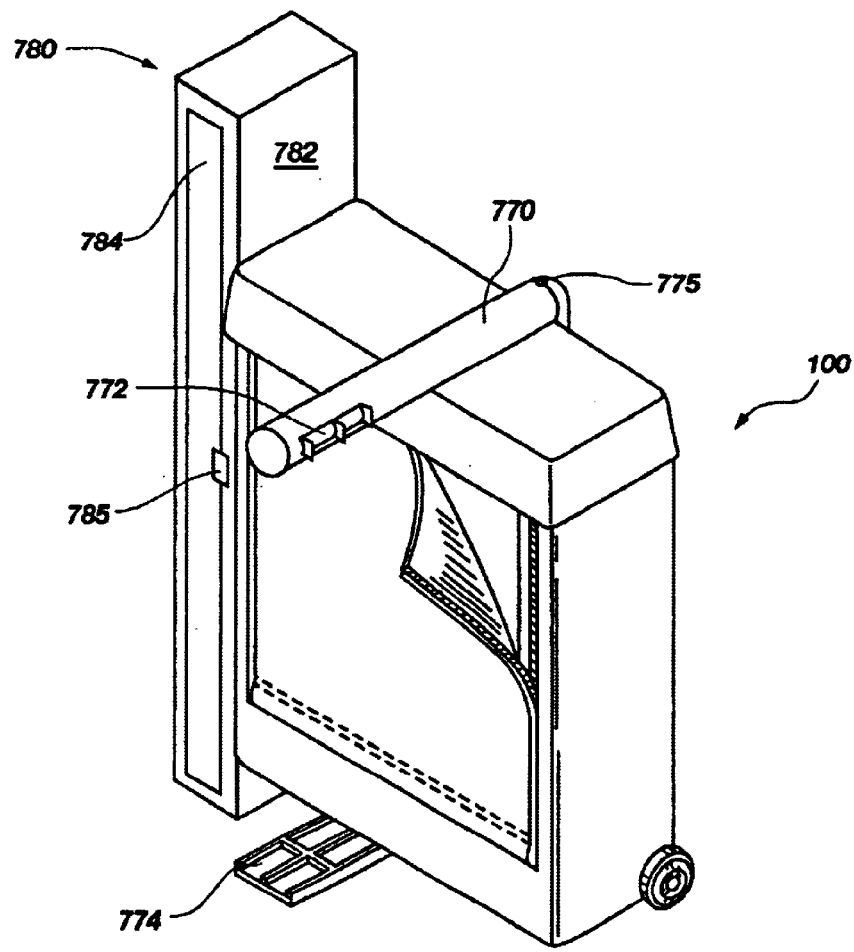
FIG. 7 illustrates an alternate embodiment of the present invention including a ski/snowboard mount incorporated with the vehicle storage device.

Another type of recreation equipment carrier, a ski/snowboard mount 770 for holding skis and/or snowboards, may also be attached to vehicle storage device 100. FIG. 7 illustrates one embodiment of a ski/snowboard mount 770 attached to vehicle storage device 100. The ski/snowboard mount 770 extends over the top of vehicle storage device 100. Support brackets 772 fixed to the ski/snowboard mount 770 provide support for skis or snowboards. Such support brackets 772 are well known in the art, and may be incorporated with the vehicle storage device 100 of the present invention. Like the bicycle mount, the ski/snowboard mount 770 may also be controllably rotated or moved about a pivot point 775 to allow a person to move skis or snowboards attached to the ski/snowboard mount to the side for access to the vehicle storage device 100. In addition, the ski/snowboard mount 770 may include a support base 774 extending below the vehicle storage device 100 to further support the tails of skis or snowboards supported by the ski/snowboard mount 770.

Alternatively, a side ski/snowboard mount 780 may be incorporated with the vehicle storage device 100 of the present invention. The side ski/snowboard mount 780 may include a rectangular box 782 having a door 784 secured by latch 785. Skis or snowboards may be stored within the rectangular box 782 in order to protect the skis or snowboards from the elements.

Other known recreational equipment carriers may also be incorporated with the vehicle storage device 100 of the present invention.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A vehicle storage device, comprising:

a frame;

a material covering at least a portion of said frame, said material defining a storage space within said frame;

a mounting plate movably attached to said frame through said material covering at least a portion of said frame by at least one hinge; and clamps attached to said mounting plate for securing said vehicle storage device to a ladder attached to a vehicle.

2. The vehicle storage device of claim 1, wherein said frame comprises a plurality of frame members fitted together to define a space within said frame members.

3. The vehicle storage device of claim 2, wherein said plurality of frame members is selected form the group consisting of plastic, metal, and wood.

4. The vehicle storage device of claim 1, wherein said material covering at least a portion of said frame is selected from the group consisting of vinyl, fleece-lined vinyl, ballistic material, metal, fiberglass, plastic, neoprene, acrylic yarn fabric, carbon fiber, steel, aluminum, and cloth.

5. The vehicle storage device of claim 1, wherein said material covering at least a portion of said frame further comprises:

an access portal in a portion of said material; and a connection device for securing said access portal to said material.

6. The vehicle storage device of claim 5, wherein said connection device for securing said access portal to said material is selected from the group consisting of zippers, snaps, ties, hooks and loop fastening materials, and hooks.

* * * * *